United States Patent
Gruwe et al.

(10) Patent No.: US 10,160,556 B2
(45) Date of Patent: Dec. 25, 2018

(54) SATELLITE ELECTRIC PROPULSION POWER SUPPLY UNIT AND SYSTEM FOR MANAGING THE ELECTRIC PROPULSION OF A SATELLITE

(71) Applicant: THALES, Courbevoie (FR)

(72) Inventors: Alain Gruwe, Brussels (BE); Philippe Ledent, Blegny (BE)

(73) Assignee: THALES, Courbevoie (FR)

( * ) Notice: Subject to any disclaimer, the term of this patent is extended or adjusted under 35 U.S.C. 154(b) by 207 days.

(21) Appl. No.: 15/087,982

(22) Filed: Mar. 31, 2016

(65) Prior Publication Data

US 2016/0297550 A1 Oct. 13, 2016

(30) Foreign Application Priority Data

Apr. 8, 2015 (EP) ..................... 15305515

(51) Int. Cl.
| | |
|---|---|
| *B64G 1/40* | (2006.01) |
| *B64G 1/42* | (2006.01) |
| *F03H 1/00* | (2006.01) |
| *B64G 1/10* | (2006.01) |

(52) U.S. Cl.
CPC .............. *B64G 1/428* (2013.01); *B64G 1/10* (2013.01); *B64G 1/40* (2013.01); *B64G 1/405* (2013.01); *F03H 1/0018* (2013.01)

(58) Field of Classification Search
CPC ............................ F03H 1/0018; B64G 1/428
See application file for complete search history.

(56) References Cited

U.S. PATENT DOCUMENTS

| | | | | |
|---|---|---|---|---|
| 6,310,320 B1 * | 10/2001 | Kraus | .................. | B23K 9/1006 |
| | | | | 219/130.33 |
| 9,181,934 B2 * | 11/2015 | Stickelmaier | .......... | B64G 1/428 |
| 2011/0080040 A1 * | 4/2011 | Kumar | ..................... | B60K 6/46 |
| | | | | 307/9.1 |

(Continued)

FOREIGN PATENT DOCUMENTS

| | | |
|---|---|---|
| EP | 2 735 736 A2 | 5/2014 |
| WO | 2012/164203 A1 | 12/2012 |
| WO | 2013/034825 A1 | 3/2013 |

OTHER PUBLICATIONS

Simens, "secure 24 VDC even when a power supply fails" 2012, pp. 1-4.*

*Primary Examiner* — Thienvu Tran
*Assistant Examiner* — Pinping Sun
(74) *Attorney, Agent, or Firm* — Baker & Hostetler LLP (57) ABSTRACT

A satellite electric propulsion power supply unit comprises: an internal source of electrical power; an external input adapted to receive an electrical power supply from an external source of electrical power; a first external output and a second external output adapted to deliver as output, respectively, a first electrical power supply and a second electrical power supply; a first selector element and a second selector element such that: the first selector element is equipped with a first internal input connected to the internal source and with two outputs: the first external output and an internal output connected to a second internal input of the second selector element; and the second selector element is equipped with an output corresponding to the second external output and with two inputs: the external input and the second internal input.

9 Claims, 7 Drawing Sheets

(56) References Cited

U.S. PATENT DOCUMENTS

| | | | |
|---|---|---|---|
| 2011/0273011 A1* | 11/2011 | de Wergifosse | H02M 7/493 307/9.1 |
| 2013/0169036 A1* | 7/2013 | Todd | H02J 4/00 307/9.1 |
| 2016/0049027 A1* | 2/2016 | Soldner | G07C 9/00174 340/5.61 |
| 2017/0210493 A1* | 7/2017 | Marchandise | B64G 1/406 |

* cited by examiner

SATELLITE ELECTRIC PROPULSION POWER SUPPLY UNIT AND SYSTEM FOR MANAGING THE ELECTRIC PROPULSION OF A SATELLITE

CROSS-REFERENCE TO RELATED APPLICATION

This application claims priority to foreign European patent application No. EP 15305515.7, filed on Apr. 8, 2015, the disclosure of which is incorporated by reference in its entirety.

FIELD OF THE INVENTION

The invention relates to a satellite electric propulsion power supply unit and to a system for managing the electric propulsion of a satellite.

BACKGROUND

Increasingly, modern satellites employ electric propulsion, making the reliability of this electric propulsion method paramount.

Figure 1A:
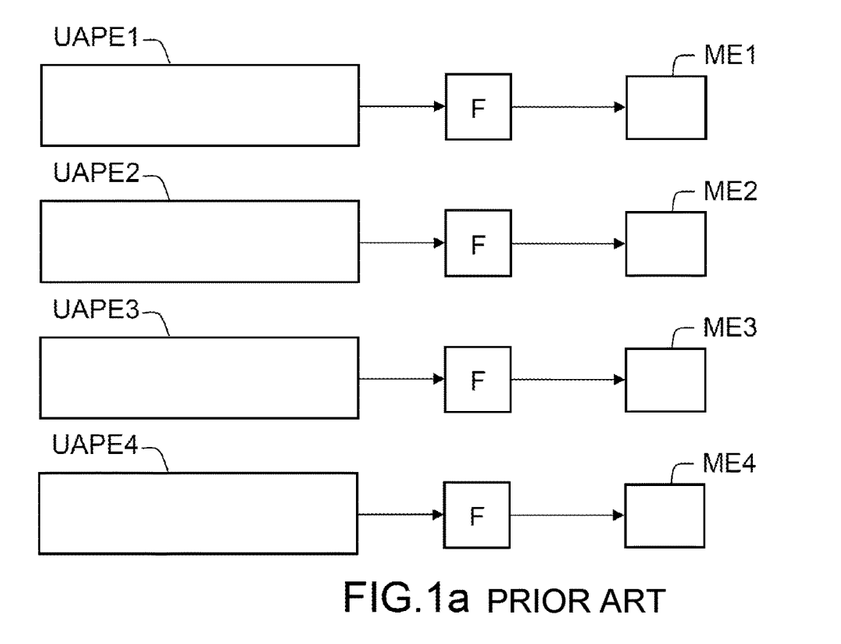
FIGS. 1a and 1b diagrammatically illustrate a satellite electric propulsion system according to the prior art.

As shown in FIG. 1A, satellite electric propulsion systems are known that comprise four power supply units UAPE1, UAPE2, UAPE3 and UAPE4 and four electric thrusters ME1, ME2, ME3 and ME4 that are respectively linked to the power supply units. In this type of system, each connection between an electric thruster ME1, ME2, ME3 and ME4 and the corresponding power supply unit UAPE1, UAPE2, UAPE3 and UAPE4 is equipped with a conducted emissions filter F.

A conducted emissions filter is a filter that mainly comprises filtering components (resistors, capacitors, inductors, . . . ), the aim of which is to filter out the interference from the thruster to the corresponding power supply unit in order to protect the power supply unit and ultimately to limit the conducted and radiated emissions sent back towards the satellite.

In such a system, the loss, or malfunction, of one electric propulsion power supply unit then means the loss of one electric thruster, which will no longer be supplied with power by a power supply unit.

Figure 1B:
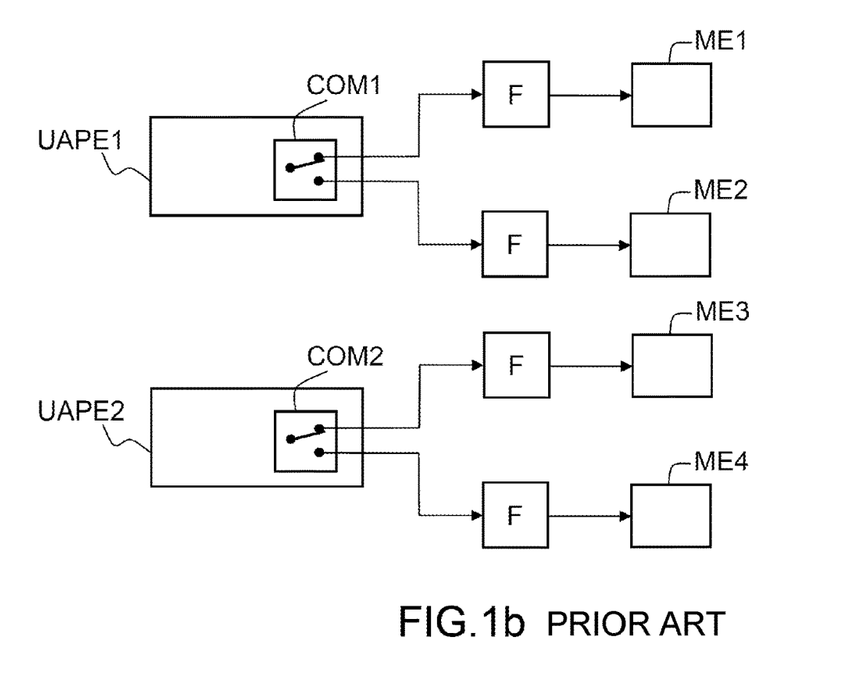

As disclosed in FIG. 1B, satellite electric propulsion systems are also known that comprise two power supply units UAPE1 and UAPE2 and four electric pthrusters ME1, ME2, ME3 and ME4. Each of the two power supply units UAPE1 and UAPE2 is respectively linked to two electric thrusters out of the four.

In this instance, the power supply unit UAPE1 is linked to the electric thrusters ME1 and ME2, and the power supply unit UAPE2 is linked to the electric thrusters ME3 and ME4. Each power supply unit UAPE1, UAPE2 is equipped with a respective switch COM1, COM2 allowing the power supply to be switched to one of the two thrusters to which it is linked.

In this instance, the switch COM1 of the power supply unit UAPE1 allows the electrical power supply from the power supply unit UAPE1 to be switched to the electric thruster ME1 or the electric thruster ME2, and the switch COM2 of the power supply unit UAPE2 allows the electrical power supply from the power supply unit UAPE2 to be switched to the electric thruster ME3 or the electric thruster ME4.

Each connection between an electric thruster ME1, ME2, ME3 and ME4 and its corresponding power supply unit UAPE1 and UAPE2 is equipped with a conducted emissions filter F.

In such a system, the loss, or malfunction, of one electric propulsion power supply unit then means the loss of two electric thrusters, which will then no longer be supplied with power by a power supply unit.

SUMMARY OF THE INVENTION

An aim of the invention is to overcome the aforementioned problems, and in particular to improve the reliability of satellite electric propulsion systems.

Additionally, according to one aspect of the invention, a satellite electric propulsion power supply unit is proposed comprising:
  an internal source of electrical power;
  an external input adapted to receive an electrical power supply from an external source of electrical power;
  a first external output and a second external output adapted to deliver as output, respectively, a first electrical power supply and a second electrical power supply;
  a first selector element and a second selector element such that:
    the first selector element is equipped with a first internal input connected to the internal source and with two outputs: the first external output and an internal output connected to a second internal input of the second selector element; and
    the second selector element is equipped with an output corresponding to the second external output and with two inputs: the external input and the second internal input.

Such a satellite electric propulsion power supply unit allows the reliability of the second external output of the power supply unit to be improved as this output may be supplied with power either by the internal source or by the external source. The first external output may then be used as the source.

In one embodiment, the satellite electric propulsion power supply unit comprises a conducted emissions noise filter positioned directly upstream of the second output.

Such a power supply unit allows a conducted emissions noise filter to be integrated and thereby increased compactness and simplicity to be achieved in terms of their integration in satellites, while avoiding having to add such filters between power supply units and electric thrusters.

In one variant, the satellite electric propulsion power supply unit comprises a conducted emissions noise filter positioned directly upstream of the first output.

If necessary, it is possible to save space in the power supply unit and/or to move the dissipation of F elsewhere.

According to one embodiment, the first selector element comprises a switch.

The implementation of the first selector element by means of a switch is easy, low cost and limits losses due to heat dissipation.

In one embodiment, the second selector element comprises a diode positioned downstream of each of the two inputs.

The use of diodes to implement the second selector element allows external control to be avoided and is low cost.

In one variant, the second selector element comprises a switch.

The use of a switch to implement the second selector element allows losses due to heat dissipation to be limited and, as in the preceding variant, a drop in DC voltage due to the diodes to be avoided.

According to one aspect of the invention, a system for managing the electric propulsion of a satellite is also proposed, comprising an electronic control unit, a plurality of N electric propulsion power supply units such as described above, respectively linked to N electric thrusters.

Each electric propulsion power supply unit is connected, via its second external output, to an electric thruster, each link between the output of the second selector element and the electric thruster comprises a conducted emissions noise filter, and each first external output of one electric propulsion power supply unit is directly connected to the external input of another electric propulsion power supply unit.

Such a system allows the reliability of the control of electric thrusters of a satellite to be significantly improved. Specifically, in the event of failure of one electric propulsion power supply unit (or multiple power supply units unless two among them are linked to one and the same electric thruster), none of the electric thrusters is lost, as in any case it may then be supplied with power by another electric propulsion power supply unit via the external input of the faulty electric propulsion power supply unit, which is connected to a first external output of this other electric propulsion power supply unit.

For example, in a typical case, the satellite has four electric thrusters (N=4).

According to one aspect of the invention, a system for managing the electric propulsion of a satellite is also proposed, comprising an electronic control unit, a plurality of N electric propulsion power supply units such as described above, a plurality of N+k electric thrusters of which N are respectively linked to the N electric propulsion power supply units, each electric propulsion power supply unit is connected, via its second external output, to an electric thruster, each link between the output of the second selector element and the electric thruster comprises a conducted emissions noise filter, k first external outputs of the electric propulsion power supply units are connected to the k remaining electric thrusters. Each link between the output of the first selector element and the electric thruster comprises a conducted emissions noise filter, and the N−k remaining first external outputs of one electric propulsion power supply unit are directly connected to the external input of another electric propulsion power supply unit.

Such a system also allows the reliability of the control of electric thrusters of a satellite comprising additional electric thrusters to be significantly improved, at reduced cost. Specifically, in such a system, the smaller the difference k between the number of electric propulsion power supply units and the number of thrusters, the more thrusters that may be supplied with power by two different electric propulsion power supply units, and hence the greater the improvement in terms of reliability.

For example, a satellite may have four electric thrusters but only three electric propulsion power supply units (N=3 and k=1).

BRIEF DESCRIPTION OF THE DRAWINGS

The invention will be better understood on studying a few embodiments described by way of wholly non-limiting examples and illustrated by the appended drawings in which.

DETAILED DESCRIPTION

In the various figures, the elements that have identical references are identical.

Figure 2:
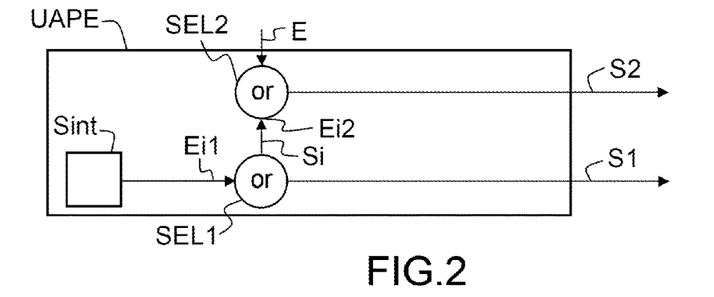
FIGS. 2, 3, 4a and 4b illustrate embodiments of a satellite electric propulsion power supply unit, according to various aspects of the invention.

FIG. 2 shows a satellite electric propulsion power supply unit UAPE that comprises an internal source Sint of electrical power and an external input E adapted to receive an electrical power supply from an external source of electrical power, in particular from another electric propulsion power supply unit UAPE.

The satellite electric propulsion power supply unit UAPE also comprises a first external output S1 and a second external output S2 adapted to deliver as output, respectively, a first electrical power supply and a second electrical power supply. The satellite electric propulsion power supply unit UAPE also comprises a first selector element SEL1 and a second selector element SEL2.

The first selector element SEL1 is equipped with a first internal input Ei1 connected to the internal source Sint and with two outputs: the first external output S1 and an internal output Si connected to a second internal input Ei2 of the second selector element SEL2.

The second selector element SEL2 is equipped with an output corresponding to the second external output S2 and with two inputs: the external input E and the second internal input Ei2.

Figure 3:
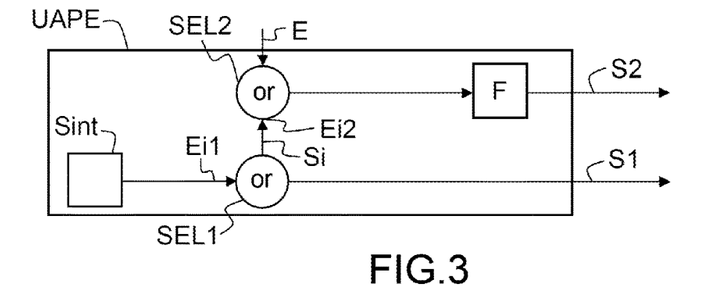

FIG. 3 illustrates one embodiment of a satellite electric propulsion power supply unit UAPE such as illustrated in FIG. 2, comprising a conducted emissions noise filter F positioned directly upstream of the second output S2, in the power supply unit UAPE.

Figure 4A:
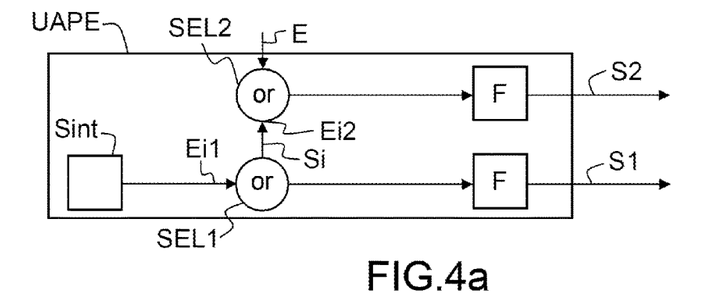

FIG. 4a illustrates one embodiment of a satellite electric propulsion power supply unit UAPE such as illustrated in FIG. 3, also comprising a conducted emissions noise filter F positioned directly upstream of the first output S1, in the power supply unit UAPE.

Figure 4B:
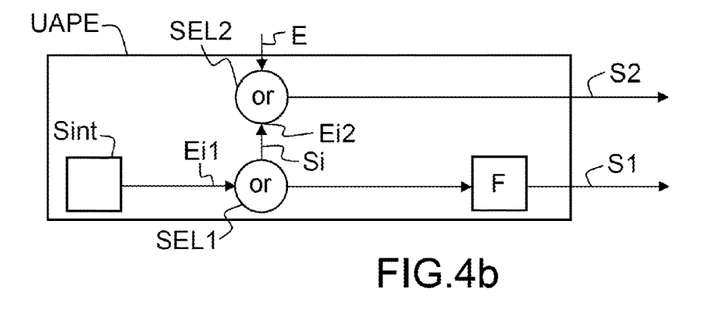

FIG. 4b illustrates one embodiment of a satellite electric propulsion power supply unit UAPE such as illustrated in FIG. 2, comprising a conducted emissions noise filter F positioned directly upstream of the first output S1, in the power supply unit UAPE.

Figure 5:
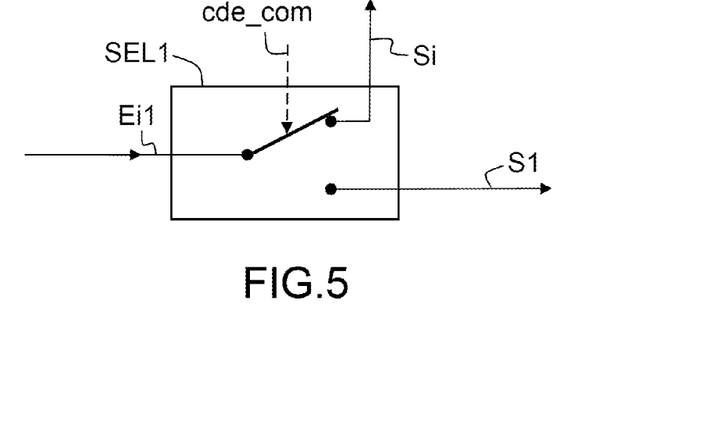
FIG. 5 diagrammatically illustrates one exemplary embodiment of a first selector element of a satellite electric propulsion power supply unit, according to one aspect of the invention.

FIG. 5 shows one exemplary embodiment of a first selector element SEL1 of a satellite electric propulsion power supply unit UAPE of one of FIG. 2, 3, 4a or 4b, implemented by means of a switch, controlled by an external command cde_com.

Figure 6A:
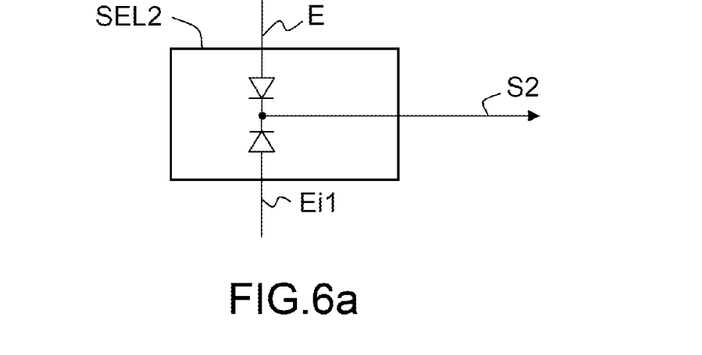
FIGS. 6a and 6b diagrammatically illustrate two exemplary embodiments of a second selector element of a satellite electric propulsion power supply unit, according to two aspects of the invention.

FIG. 6a shows one exemplary embodiment of a second selector element SEL2 of a satellite electric propulsion power supply unit UAPE of one of FIG. 2, 3, 4a or 4b, implemented by means of two diodes, with one diode positioned downstream of each of the two inputs E, Ei2.

Figure 6B:
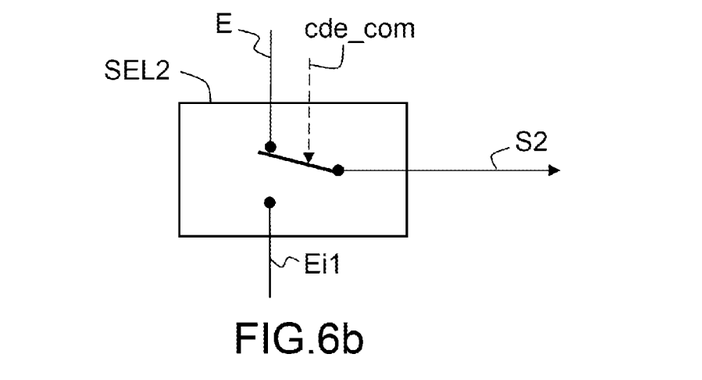

FIG. 6b shows an alternative exemplary embodiment of a second selector element SEL2 of a satellite electric propulsion power supply unit UAPE of one of FIG. 2, 3, 4a or 4b, implemented with a switch, controlled by an external command cde_com.

Figure 7A:
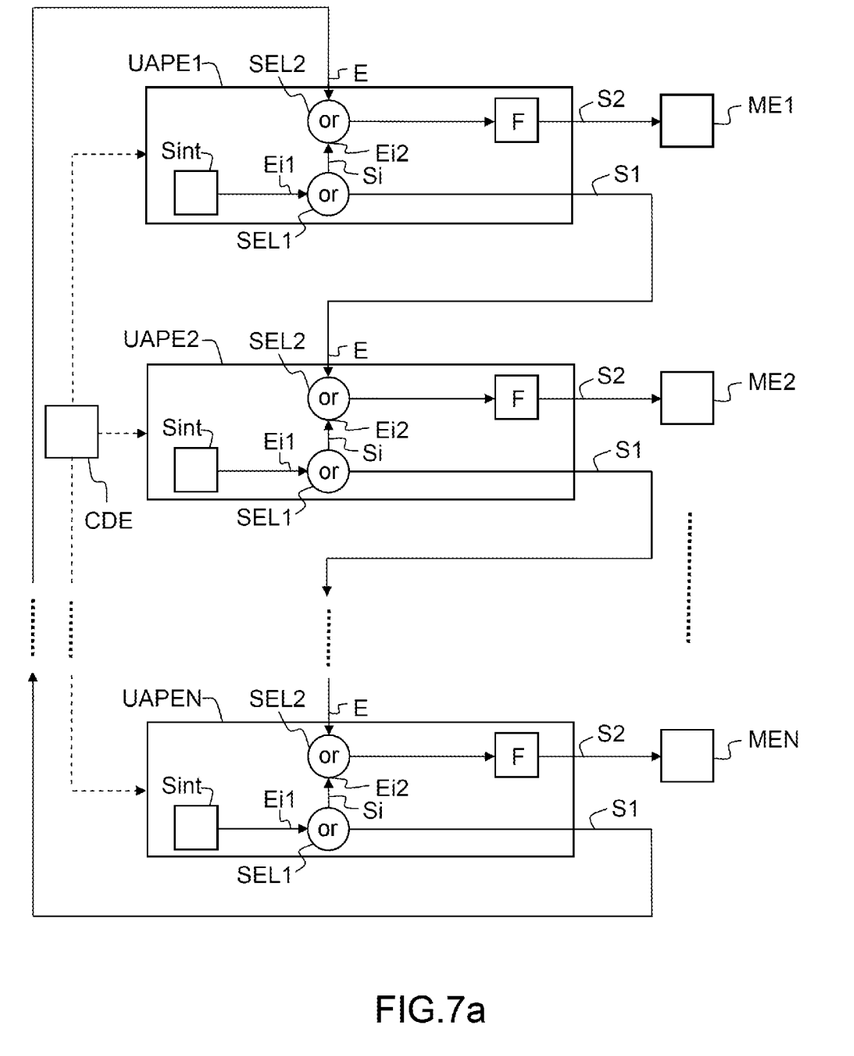
FIGS. 7a and 7b diagrammatically illustrate two exemplary embodiments of a system for managing the electric propulsion of a satellite, according to two aspects of the invention.

FIG. 7a shows a system for managing the electric propulsion of a satellite, comprising an electronic control unit CDE, a plurality of N electric propulsion power supply units UAPE1, ..., UAPEN such as described above, respectively linked to N electric thrusters ME1, ..., MEN. Each electric propulsion power supply unit UAPE1, ..., UAPEN is connected, via its second external output S2, to a respective electric thruster ME1, ..., MEN.

Each link between the output of the second selector element SEL2 and the corresponding electric thruster ME1, ..., MEN comprises a conducted emissions noise filter F, and each first external output S1 of one electric propulsion power supply unit UAPE1, ..., UAPEN is directly connected to the external input E of another electric propulsion power supply unit.

In the embodiment of FIG. 7a, all of the conducted emissions noise filters F are inside the electric propulsion power supply units UAPE1, ..., UAPEN.

Figure 7B:
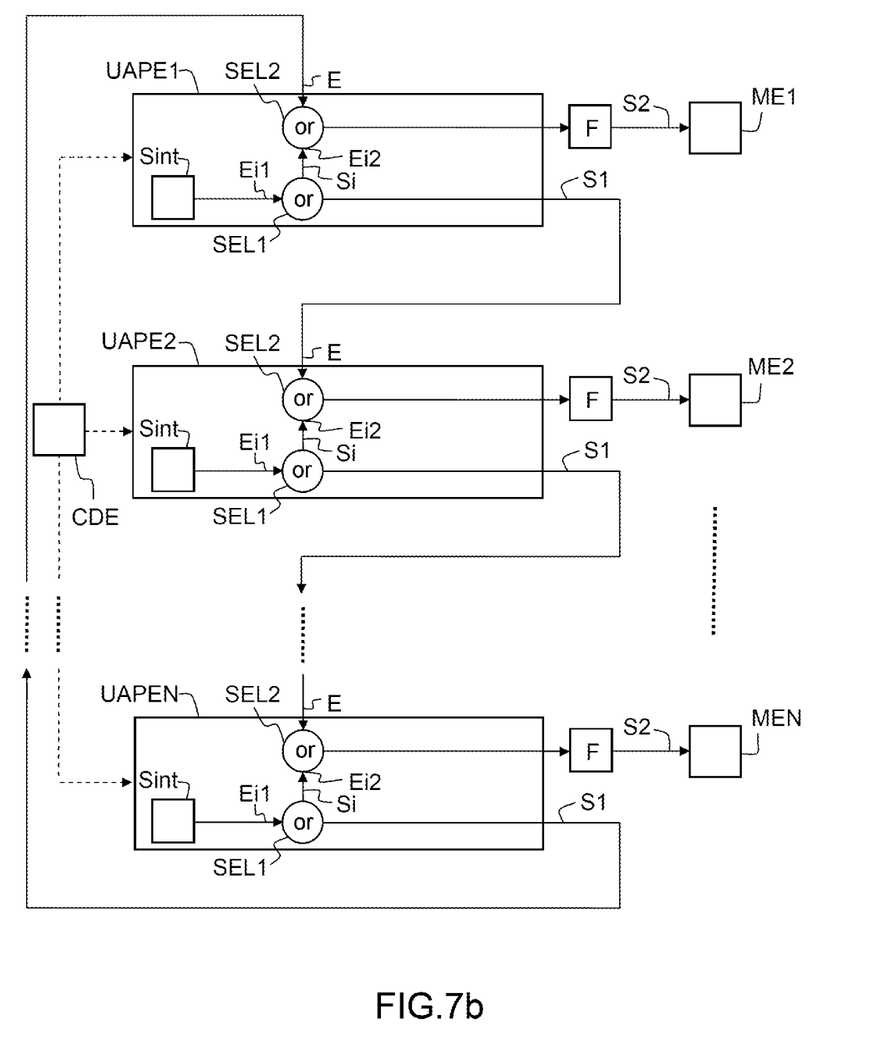

In one variant, in FIG. 7b all of the conducted emissions noise filters F are outside the electric propulsion power supply units UAPE1, ...,UAPEN.

Of course, for other variants that are not shown in the figures, some conducted emissions noise filters F are inside electric propulsion power supply units and the other, remaining conducted emissions noise filters F are outside the remaining electric propulsion power supply units.

For cost reasons, it is preferable to retain an embodiment in which the filters are either all inside the electric propulsion power supply units or all outside the electric propulsion power supply units, thereby allowing a large number of identical electric propulsion power supply units to be mass produced. Basically, a solution in which all of the Fs are internal is better as fewer external devices are required, meaning fewer devices to produce and to test and hence reduced cost.

Figure 8A:
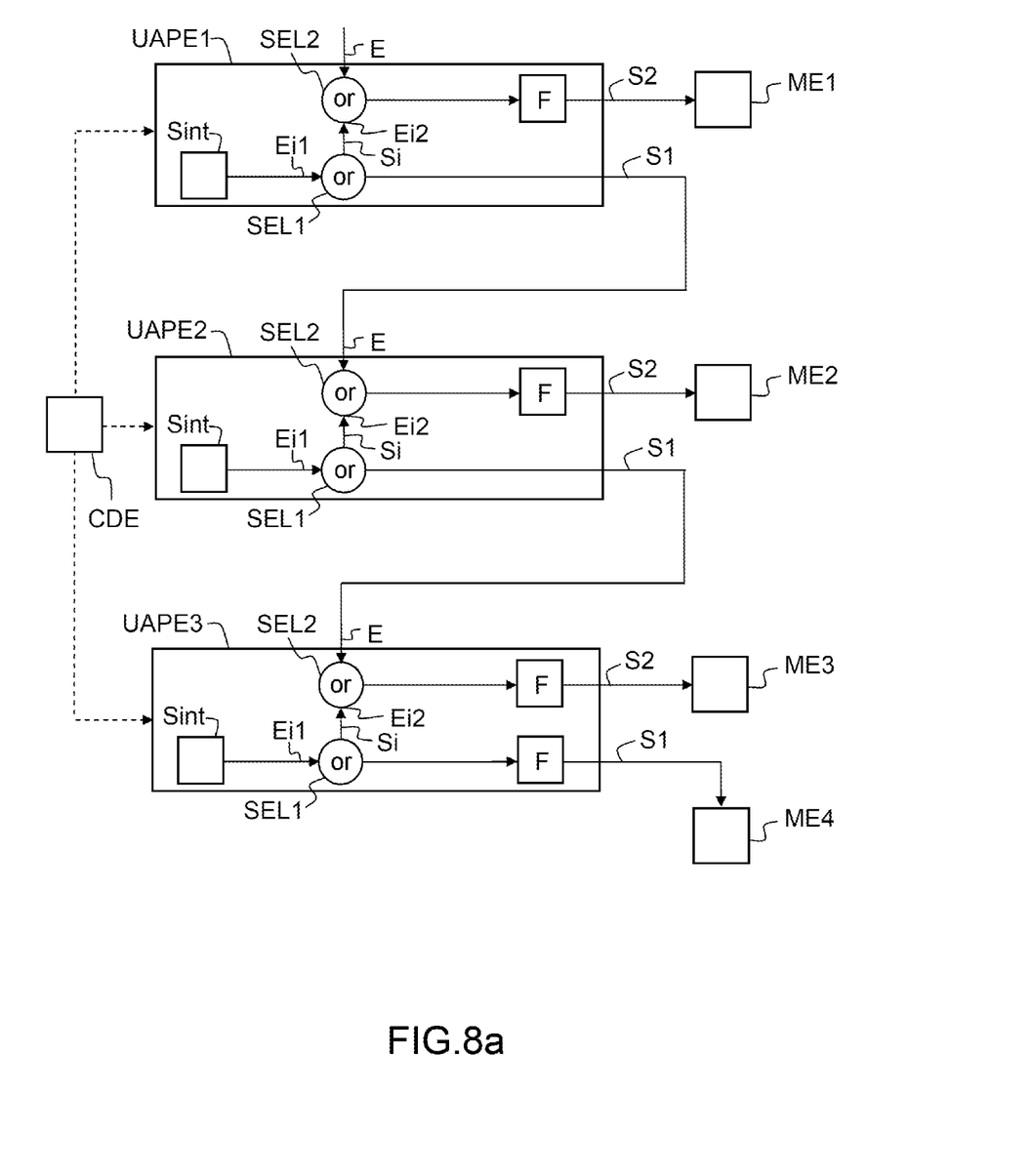
FIGS. 8a and 8b diagrammatically illustrate two exemplary embodiments of a system for managing the electric propulsion of a satellite, according to two other aspects of the invention.

FIG. 8a is a non-limiting exemplary embodiment of a system for managing the electric propulsion of a satellite, comprising three power supply units UAPE1, UAPE2, UAPE3 and four electric thrusters ME1, ..., ME4 (N=3 and k=1), an electronic control unit CDE, a plurality of three (N=3) electric propulsion power supply units UAPE1, UAPE2, UAPE3 such as described above and a plurality of four (N+k=4) electric thrusters ME1, ..., ME4, three of which (N=3) ME1, ME2, ME3 are respectively linked to the three (N=3) electric propulsion power supply units UAPE1, ..., UAPE3.

Each electric propulsion power supply unit UAPE1, UAPE2, UAPE3 is connected, via its second external output S2, to an electric thruster MEI, ME2, ME3 (N=3) and each link between the output of the second selector element SEL2 and an electric thruster ME1, ME2, ME3 comprises a conducted emissions noise filter F. One (k=1) first external output S1 of the electric propulsion power supply unit, in this instance UAPE3, is connected to the electric thruster ME4 (k=1).

The link between the output of the first selector element SEL1 of the electric propulsion power supply unit UAPE3 and the electric thruster ME4 comprises a conducted emissions noise filter F.

The two (N−k=3−1=2) remaining first external outputs S1 of one electric propulsion power supply unit UAPE1, UAPE2 are directly connected to the external input E of another electric propulsion power supply unit.

Figure 8B:
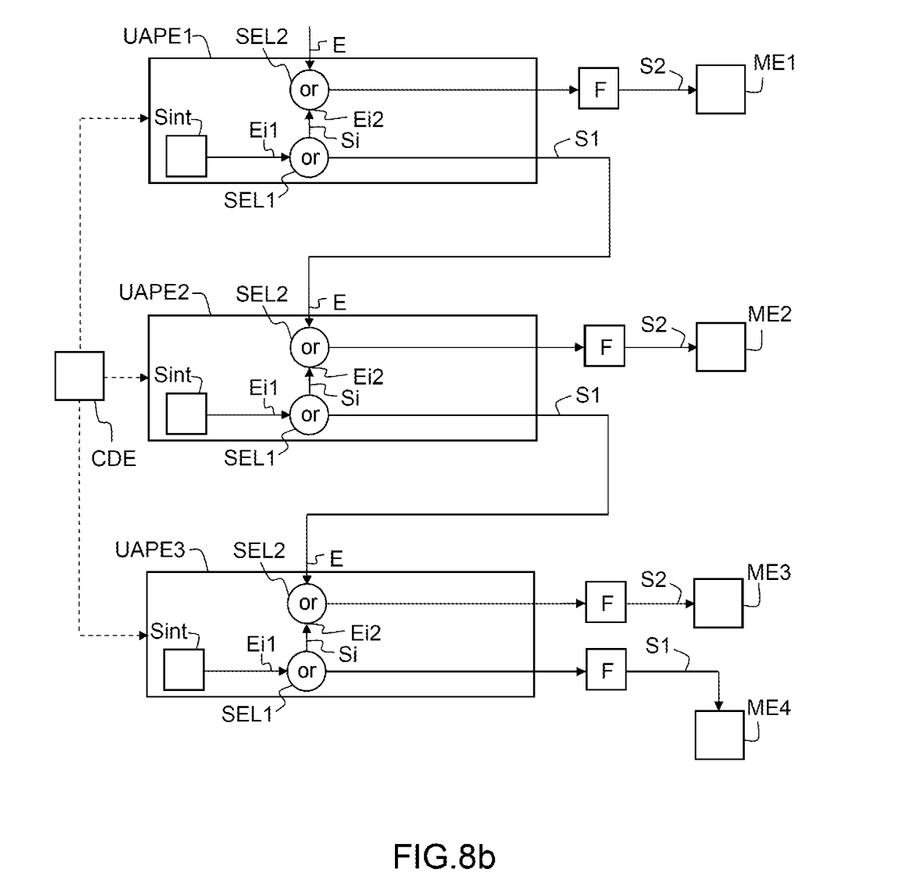

In one variant, in FIG. 8b all of the conducted emissions noise filters F are outside the electric propulsion power supply units UAPE1, ..., UAPE3.

Of course, in other variants that are not shown in the figures, some conducted emissions noise filters F may be inside electric propulsion power supply units and the other, remaining conducted emissions noise filters F may be outside the remaining electric propulsion power supply units.

FIGS. 8a and 8b show particularly interesting embodiments with three electric propulsion power supply units and four electric thrusters (N=3, k=1), in a non-limiting manner, as it is evident that these embodiments may easily be extrapolated to N electric propulsion power supply units and N+k electric thrusters.

The present invention therefore proposes satellite electric propulsion power supply units that are low cost as they contain numerous elements that are already integrated, along with satellite electric propulsion management systems with improved reliability and at low cost.

The invention claimed is:

1. A system for managing the electric propulsion of a satellite, the system comprising:
    an electronic control unit; and
    a plurality of N electric propulsion power supply units, respectively linked to N electric thrusters, wherein
    each of the plurality of N electric propulsion power supply units comprises:
        an internal source of electrical power;
        an external input adapted to receive an electrical power supply from an external source of electrical power;
        a first external output and a second external output adapted to deliver a first electrical power supply and a second electrical power supply, respectively;
        a first selector element and a second selector element such that:
            the first selector element is equipped with a first internal input connected to the internal source and with two outputs: the first external output and an internal output connected to a second internal input of the second selector element; and
            the second selector element is equipped with an output corresponding to the second external output and with two inputs: the external input and the second internal input,
    each electric propulsion power supply unit is connected, via its second external output, to an electric thruster, each link between the output of the second selector element and the electric thruster comprises a conducted emissions noise filter, and each first external output of one electric propulsion power supply unit is directly connected to the external input of another electric propulsion power supply unit, and
    N is a positive integer.

2. The system according to claim 1, wherein the value of N is 4.

3. A system for managing the electric propulsion of a satellite, the system comprising:
- an electronic control unit;
- a plurality of N electric propulsion power supply units;
- a plurality of N+k electric thrusters of which N are respectively linked to the N electric propulsion power supply units, wherein each of the plurality of N electric propulsion power supply units comprises:
- an internal source of electrical power;
- an external input adapted to receive an electrical power supply from an external source of electrical power;
- a first external output and a second external output adapted to deliver a first electrical power supply and a second electrical power supply, respectively;
- a first selector element and a second selector element such that:
  - the first selector element is equipped with a first internal input connected to the internal source and with two outputs: the first external output and an internal output connected to a second internal input of the second selector element and
  - the second selector element is equipped with an output corresponding to the second external output and with two inputs: the external input and the second internal input, each electric propulsion power supply unit is connected, via its second external output, to an electric thruster, each link between the output of the second selector element and the electric thruster comprises a conducted emissions noise filter, k first external outputs of the electric propulsion power supply units are connected to the k remaining electric thrusters, each link between the output of the first selector element and the electric thruster comprises a conducted emissions noise filter, and the N−k remaining first external outputs of one electric propulsion power supply unit are directly connected to the external input of another electric propulsion power supply unit, and N and k are each positive integers.

4. The satellite electric propulsion power supply unit according to claim 1, wherein the conducted emissions noise filter is positioned directly upstream of the second output.

5. The satellite electric propulsion power supply unit according to claim 1, wherein the conducted emissions noise filter is positioned directly upstream of the first output.

6. The satellite electric propulsion power supply unit according to claim 1, wherein the first selector element comprises a switch.

7. The satellite electric propulsion power supply unit according to claim 1, wherein the second selector element comprises a diode positioned downstream of each of the two inputs.

8. The satellite electric propulsion power supply unit according to claim 1, wherein the second selector element comprises a switch.

9. The system according to claim 3, wherein the value of N is 3 and the value of k is 1.

* * * * *